United States Patent
Wu et al.

(10) Patent No.: US 11,500,934 B2
(45) Date of Patent: Nov. 15, 2022

(54) POI RECOMMENDATION METHOD AND DEVICE BASED ON GRAPH DATABASE, AND STORAGE MEDIUM

(71) Applicant: Vesoft. Inc, HangZhou (CN)

(72) Inventors: Min Wu, HangZhou (CN); Pengwei Chen, HangZhou (CN); Xiaomeng Ye, HangZhou (CN)

(73) Assignee: Vesoft. Inc, Hangzhou (CN)

( * ) Notice: Subject to any disclaimer, the term of this patent is extended or adjusted under 35 U.S.C. 154(b) by 0 days.

(21) Appl. No.: 17/325,245

(22) Filed: May 20, 2021

(65) Prior Publication Data

US 2021/0406313 A1   Dec. 30, 2021

(30) Foreign Application Priority Data

Jun. 30, 2020  (CN) .......................... 202010621177.9
Jul. 21, 2020  (CN) .......................... 202010703591.4

(51) Int. Cl.
*G06F 16/901* (2019.01)
*G06F 16/903* (2019.01)
*G06N 5/02* (2006.01)

(52) U.S. Cl.
CPC .... *G06F 16/9024* (2019.01); *G06F 16/90344* (2019.01); *G06N 5/02* (2013.01)

(58) Field of Classification Search
CPC ........... G06F 16/9024; G06F 16/90344; G06F 16/909; G06N 5/02
See application file for complete search history.

(56) References Cited

U.S. PATENT DOCUMENTS

| | | | |
|---|---|---|---|
| 10,275,403 B2* | 4/2019 | James | G06F 16/24554 |
| 2012/0158637 A1* | 6/2012 | Kshetramade | G06Q 50/01 706/50 |
| 2013/0325780 A1* | 12/2013 | Prakash | G06N 5/02 706/46 |
| 2014/0019490 A1* | 1/2014 | Roy | G06F 16/113 707/798 |
| 2014/0344191 A1* | 11/2014 | Lebow | G06N 5/02 706/11 |
| 2016/0246871 A1* | 8/2016 | Singh | G06F 16/285 |
| 2017/0132226 A1* | 5/2017 | Kalis | H04L 51/52 |
| 2017/0277907 A1* | 9/2017 | Dang | G06F 16/9024 |
| 2018/0189805 A1* | 7/2018 | Lebesis | G06Q 30/0269 |
| 2020/0311563 A1* | 10/2020 | Beller | G06F 16/387 |

* cited by examiner

*Primary Examiner* — Jorge A Casanova
(74) *Attorney, Agent, or Firm* — Bayramoglu Law Offices LLC

(57) ABSTRACT

A POI recommendation method based on the graph database includes: acquiring an ID and positioning information of a target user; according to the ID and the positioning information of the target user, acquiring a feature vector of the target user, a friend intimacy coefficient of the target user and a target POI set from a target graph database, wherein the target POI set is a set composed of POIs within a preset distance range queried according to the positioning information; according to the target POI set, acquiring a feature matrix of a user set with related POI consumption records from the target graph database, wherein the related POI consumption records are consumption records associated with any POI in the target POI set; and according to the friend intimacy coefficient, the feature vector of the target user and the feature matrix, determining a target POI from the target POI set.

17 Claims, 3 Drawing Sheets

POI RECOMMENDATION METHOD AND DEVICE BASED ON GRAPH DATABASE, AND STORAGE MEDIUM

CROSS REFERENCE TO THE RELATED APPLICATIONS

This application is based upon and claims priority to Chinese Patent Application No. 202010703591.4 filed on Jul. 21, 2020, and Chinese Patent Application No. 202010621177.9 filed on Jun. 30, 2020, the entire contents of which are incorporated herein by reference.

TECHNICAL FIELD

An embodiment of the present invention relates to the field of big data, in particular to a POI recommendation method and device based on a graph database.

BACKGROUND

POI is the abbreviation of point of interest. In the field of local life, POI usually refers to places in which consumers are interested, such as scenic spots, cinemas, restaurants and the like. The POI personalized recommendation service based on the geographic position not only can provide convenience for consumers, but also can bring huge commercial benefits to merchants.

The current local life POI recommendation system usually adopts offline calculation and preparation in the data warehouse to perform POI recommendation. For example, processing calculation is performed for minutes or hours by Hive SQL or Spark Job to obtain a pre-recommendation result, and the recommendation result is stored in a cache database such as Redis for real-time query. There are two main problems in the method:

1. Since the geographic position of the request cannot be known in advance, most of the possible POIs must be calculated in advance. But in fact, for each consumer, it is only possible to reach a small part of POIs in a day or a week. Therefore, it will cause a great waste of calculation resources in actual application.

2. Personalized recommendation cannot be realized. The personalized recommendation algorithm of "thousands of people having thousands of faces" requires multi-dimensional data such as real-time position, the social relationship of the consumer, the merchant POI, the historical consumption records, the historical evaluation records of the merchants and the like. Information such as the social relationship, the historical consumption records, the preference and the like constitutes a large-scale topological relationship network, and the recommendation algorithm is required to perform graph traversal in the topological relationship network to acquire data. However, the data storage format in the data warehouse is not suitable for acquiring the data depending on graph traversal. Therefore, the traditional recommendation algorithm cannot use the data with great business reference value such as real-time position and relationship network, which finally leads to the lack of personality of the recommendation result.

SUMMARY

To solve the at least one technical problem, the present invention provides a POI recommendation method and device based on a graph database to realize personalized recommendation and meet the requirements of different consumers.

In a first aspect, an embodiment of the present application provides a POI recommendation method based on a graph database. The method includes the following steps: acquiring an ID and positioning information of a target user;

according to the ID and the positioning information of the target user, acquiring a feature vector of the target user, a friend intimacy coefficient of the target user and a target POI set from a target graph database, wherein the feature vector of the target user consists of personal data of the target user, the personal data of the target user includes user information and preference information, and the target POI set is a set composed of POIs within a preset distance range queried according to the positioning information;

acquiring a feature matrix of a user set with related POI consumption records from the target graph database according to the target POI set, wherein the related POI consumption records are consumption records associated with any POI in the target POI set, the feature matrix consists of personal data of each user in the user set, and the personal data of each user includes personal information and preference information; and according to the friend intimacy coefficient, the feature vector of the target user and the feature matrix, determining a target POI from the target POI set.

Optionally, in the method provided by the embodiment of the present application, the step: according to the friend intimacy coefficient, the feature vector of the target user and the feature matrix, determining a target POI from the target POI set, includes:

according to the friend intimacy coefficient, calculating a similarity of the feature vector of the target user and each of the feature matrixes; and determining the target POI from the target POI set according to each of the similarities.

Optionally, the method provided by the embodiment of the present application further includes:

acquiring target data and importing the target data into a pre-built graph database to acquire a target graph database, wherein the target data comprises POI data, user data, and an association relationship between the POI data and the user data.

Optionally, in the method provided by the embodiment of the present application, the step: acquiring target data and importing the target data into a pre-built graph database to acquire a target graph database, includes:

acquiring the target data in a data warehouse, the target data comprising POI data, user data, and an association relationship between the POI data and the user data;

processing the target data into graph elements of the graph database;

building batched tasks and converting the graph elements into a file format of the graph database in batches to acquire a graph element file; and pulling the graph element file from the data warehouse to a graph database server corresponding to the graph database and ingesting it into the graph database to acquire the target graph database.

Optionally, in the method provided by the embodiment of the present application, the step: according to the ID and the positioning information of the target user, acquiring a feature vector of the target user, a friend intimacy coefficient of the target user and a target POI set, specifically includes the following steps:

invoking a user-defined function and querying personal data of the target user and the friend intimacy coefficient of the target user according to the ID of the target user, the personal data of the target user comprising user information and preference information;

forming the feature vector of the target user by the personal data of the target user; and invoking the user self-defined function, querying POI within a preset distance range according to the positioning information, and forming the target POI set by the POI in the preset distance range.

Optionally, in the method provided by the embodiment of the present application, the step: according to the target POI set, acquiring a feature matrix of a user set with related POI consumption records, includes the following steps:

invoking the user-defined function, querying users with related POI consumption records, and forming a user set by the users with the related consumption records, the related POI being any POI in the target POI set;

sequentially acquiring personal data of each user in the user set and sequentially forming a first feature vector by the personal data of each user, wherein the personal data of each user includes personal information and preference information; and forming a feature matrix by the first feature vector of each user in the user set to acquire a feature matrix of the user set, wherein each column of element in the feature vector is the first feature vector of one user in the user set.

Optionally, in the method provided by the embodiment of the present application, the step: forming a user set by users with related POI consumption records, and processing the user set, includes: de-duplicating each user in the user set.

Optionally, in the method provided by the embodiment of the present application, the step: according to the friend intimacy coefficient, calculating a similarity of the feature vector of the target user and each of the feature matrixes, includes according to a similarity calculation function, calculating a similarity of the feature vector of the target user and the feature matrix, wherein a similarity calculation formula is as follows:

$$sim(\alpha, X, Y) = \alpha \times \frac{\sum_{i=1}^{n}(x_i \times y_i)}{\sqrt{\sum_{i=1}^{n}(x_i)^2} \times \sqrt{\sum_{i=1}^{n}(y_i)^2}}$$

X representing the feature vector of the target user, Y representing the feature matrix, $\alpha$ being the friend intimacy coefficient of X and Y, Xi being the $i^{th}$ element in X, yi being the $i^{th}$ column of element in Y, and n respectively representing the total number of the elements in X or the total column number of the elements in Y.

Optionally, in the method provided by the embodiment of the present application, the step: determining the target POI from the target POI set according to each of the similarities, includes:

sorting the similarity results in a descending order;

selecting the top n users in the similarity order; and querying the POI which is consumed most by the top n users in the order to acquire the target POI.

Optionally, in the method provided by the embodiment of the present application, after the step: acquiring an ID and positioning information of a target user, the method further includes the following steps:

transmitting the ID and the positioning information of the target user to the graph database;

receiving a target POI returned by the graph database; and returning the target POI, wherein the step: the graph database acquires the target POI and returns the target POI, includes:

according to the ID and the positioning information of the target user, acquiring a feature vector of the target user, a friend intimacy coefficient of the target user and a target POI set, the feature vector of the target user consisting of personal data of the target user, acquiring a feature matrix of a user set with related POI consumption records according to the target POI set, the related POI consumption records being consumption records associated with any POI in the target POI set, and the feature matrix consisting of personal data of each user in the user set, calculating a similarity of the feature vector of the target user and each of the feature matrixes according to the friend intimacy coefficient, determining the target POI from the target POI set according to each of the similarities, and returning the target POI.

Optionally, in the method provided by the embodiment of the present application, the step: acquiring the target POI set from the target graph database according to the positioning information, includes:

acquiring different grid IDs corresponding to each POI in the target graph database, wherein each grid ID of each POI corresponds to one grid level;

building a mapping relationship from each POI to different grid IDs and caching the mapping relationship in the graph database;

receiving target geographic coordinates and acquiring a target geographic coverage area according to the target geographic coordinates;

acquiring a grid ID set of the target geographic coverage area according to a preset target grid level; and according to the mapping relationship from each POI to different grid IDs, querying a POI set corresponding to the grid ID set from the graph database.

Optionally, in the method provided by the embodiment of the present application, the step: acquiring different grid IDs corresponding to each POI in the target graph database, includes:

based on a geographic geometry library, calculating the grid ID of each POI under different grid levels to acquire different grid IDs corresponding to each POI, wherein the grid level and the grid IDs under different grid levels are pre-defined by the geographic geometry library.

Optionally, in the method provided by the embodiment of the present application, the step: building a mapping relationship from each POI to different grid IDs and caching the mapping relationship in the graph database, specifically includes the following steps:

taking each POI as a POI node of the graph database respectively;

taking different grid IDs corresponding to each POI as a grid node of the graph database respectively; and building a mapping relationship between each POI node and different grid nodes corresponding to each POI, wherein the attribute of the mapping relationship is a grid level.

Optionally, in the method provided by the embodiment of the present application, the step: building a mapping relationship from each POI to different grid IDs and caching the mapping relationship in the graph database, specifically includes the following steps: building a suspension relationship between each POI and the corresponding different grid IDs respectively and storing it in an independent graph space.

Optionally, in the method provided by the embodiment of the present application, the step: receiving target geographic coordinates and acquiring a target geographic coverage area according to the target geographic coordinates, includes:

calculating the target geographic coverage area of the target geographic coordinates according to a preset coverage mode, wherein the coverage mode includes circular coverage or polygonal coverage.

Optionally, in the method provided by the embodiment of the present application, the step: calculating the target geographic coverage area of the target geographic coordinates according to a preset coverage mode, includes:

acquiring circle center coordinates and a radius when calculating the target geographic coverage area of the target geographic coordinates according to the circular coverage mode, and building the target geographic coverage area according to the circle center coordinates and the radius; or acquiring coordinates of each vertex of a polygon when calculating the geographic coverage area of the geographic coordinates according to the polygonal coverage mode, and building the target geographic coverage area according to the coordinates of each vertex.

Optionally, in the method provided by the embodiment of the present application, the step: acquiring a grid ID set of the target geographic coverage area according to a preset target grid level, includes:

calculating a grid ID of the target geographic coverage area based on the geographic geometry library and according to the preset target grid level, wherein the geographic geometry library is google s2, the geographic geometry library pre-defining 30 grid levels, and each geographic coordinate has a grid ID in each grid level.

In a second aspect, an embodiment of the present application further provides a POI query method based a distributed graph database. The method includes the following steps:

acquiring different grid IDs corresponding to each POI, wherein each grid ID of each POI corresponds to one grid level;

building a mapping relationship from each POI to different grid IDs and caching the mapping relationship in the graph database;

receiving target geographic coordinates and acquiring a target geographic coverage area according to the target geographic coordinates;

acquiring a grid ID set of the target geographic coverage area according to a preset target grid level; and according to the mapping relationship from each POI to different grid IDs, querying a POI set corresponding to the grid ID set from the graph database.

Optionally, in the method provided by the embodiment of the present application, the step: acquiring different grid IDs corresponding to each POI, includes:

based on a geographic geometry library, calculating the grid ID of each POI under different grid levels to acquire different grid IDs corresponding to each POI, wherein the grid level and the grid IDs under different grid levels are pre-defined by the geographic geometry library.

Optionally, in the method provided by the embodiment of the present application, the step: building a mapping relationship from each POI to different grid IDs and caching the mapping relationship in the graph database, specifically includes the following steps:

taking each POI as a POI node of the graph database respectively; taking different grid IDs corresponding to each POI as grid nodes of the graph database respectively; and building a mapping relationship between each POI node and different grid nodes corresponding to each POI, wherein the attribute of the mapping relationship is a grid level.

Optionally, in the method provided by the embodiment of the present application, the step: building a mapping relationship from each POI to different grid IDs and caching the mapping relationship in the graph database, specifically includes the following steps:

building a suspension relationship between each POI and the corresponding different grid IDs respectively and storing it in an independent graph space.

Optionally, in the method provided by the embodiment of the present application, the step: receiving target geographic coordinates and acquiring a target geographic coverage area according to the target geographic coordinates, includes:

calculating the target geographic coverage area of the target geographic coordinates according to a preset coverage mode, wherein the coverage mode includes circular coverage or polygonal coverage.

Optionally, in the method provided by the embodiment of the present application, the step: calculating the target geographic coverage area of the target geographic coordinates according to a preset coverage mode, includes:

acquiring circle center coordinates and a radius when calculating the target geographic coverage area of the target geographic coordinates according to the circular coverage mode, and building the target geographic coverage area according to the circle center coordinates and the radius; or acquiring coordinates of each vertex of a polygon when calculating the geographic coverage area of the geographic coordinates according to the polygonal coverage mode, and building the target geographic coverage area according to the coordinates of each vertex.

Optionally, in the method provided by the embodiment of the present application, the step: acquiring a grid ID set of the target geographic coverage area according to a preset target grid level, includes:

calculating a grid ID of the target geographic coverage area based on the geographic geometry library and according to the preset target grid level, wherein the geographic geometry library is google s2, the geographic geometry library pre-defining 30 grid levels, and each geographic coordinate has a grid ID in each grid level.

In a third aspect, an embodiment of the present application further provides a POI recommendation device based on a graph database. The device includes the:

a first acquisition module, configured to acquire an ID and positioning information of a target user;

a second acquisition module, configured to acquire a feature vector of the target user, a friend intimacy coefficient of the target user and a target POI set from a target graph database according to the ID and the positioning information of the target user, wherein the feature vector of the target user consists of personal data of the target user, the personal data of the target user includes user information and preference information, and the target POI set is a set composed of POIs within a preset distance range queried according to the positioning information;

a third acquisition module, configured to acquire a feature matrix of a user set with related POI consumption records from the target graph database according to the target POI set, wherein the related POI consumption records are consumption records associated with any POI in the target POI set, the feature matrix consists of personal data of each user in the user set, and the personal data of each user includes personal information and preference information; and a determination module, configured to determine a target POI from the target POI set according to the friend intimacy coefficient, the feature vector of the target user and the feature matrix.

In a fourth aspect, an embodiment of the present application further provides a POI query device based a distributed graph database. The device includes:

a fourth acquisition module, configured to acquire different grid IDs corresponding to each POI, wherein each grid ID of each POI corresponds to one grid level;

a building module, configured to build a mapping relationship from each POI to different grid IDs and caching the mapping relationship in the graph database;

a fifth acquisition module, configured to receive target geographic coordinates and acquire a target geographic coverage area according to the target geographic coordinates;

a sixth acquisition module, configured to acquire a grid ID set of the target geographic coverage area according to a preset target grid level; and a query module, configured to query a POI set corresponding to the grid ID set from the graph database according to the mapping relationship from each POI to different grid IDs.

In a fifth aspect, an embodiment of the present application further provides an electronic device, including a processor, a storage medium and a computer program, wherein the computer program is stored in the storage medium; and the computer program, when being executed by the processor, enables the processor to implement the POI recommendation method based on the graph database as defined in any one of the above.

In a sixth aspect, an embodiment of the present application further provides an electronic device, including a processor, a storage medium and a computer program, wherein the computer program is stored in the storage medium; and the computer program, when being executed by the processor, enables the processor to implement the POI query method based on the distributed graph database as defined in any one of the above.

In a seventh aspect, an embodiment of the present application further provides a storage medium, storing a computer program. The computer program, when being executed by a processor, enables the processor to implement the POI recommendation method based on the graph database as defined in any one of the above.

In an eighth aspect, an embodiment of the present application further provides a storage medium, storing a computer program. The computer program, when being executed by a processor, enables the processor to implement the POI recommendation method based on the graph database as defined in any one of the above.

The additional aspects and the advantages of the present invention will be given in the following description part, some of which will become obvious from the following description or be understood through the practice of the present invention.

DETAILED DESCRIPTION OF THE EMBODIMENTS

To understand the objectives, features and advantages of the present invention more clearly, the present invention is further described below in detail with reference to the accompanying drawings and the specific embodiments. It should be noted that the embodiments of the present application and features in the embodiments may be combined with each other in a non-conflicting situation.

In the following description, many specific details are set forth in order to facilitate full understanding of the present invention, but the present invention may also be implemented in other ways other than those described herein. Therefore, the protection scope of the present invention is not limited by the specific embodiments disclosed below.

In several examples provided herein, it should be understood that the disclosed device and method may be implemented in other manners. For example, the described device example is merely an example. For example, the unit division is merely logical function division and may be other division in actual implementation. For example, a plurality of units or components may be combined or integrated into another system, or some features may be ignored or not performed. In addition, the intercoupling or direct coupling or communication connection shown or discussed may be indirect coupling or communication connection through some interfaces, devices, or units; or may be implemented in electrical, mechanical, or other forms.

The embodiment provides a POI query method based on a distributed graph database, which is intended to meet the query requirements of graph and geographic position information simultaneously, thereby rapidly querying the nearby POI.

Figure 1:
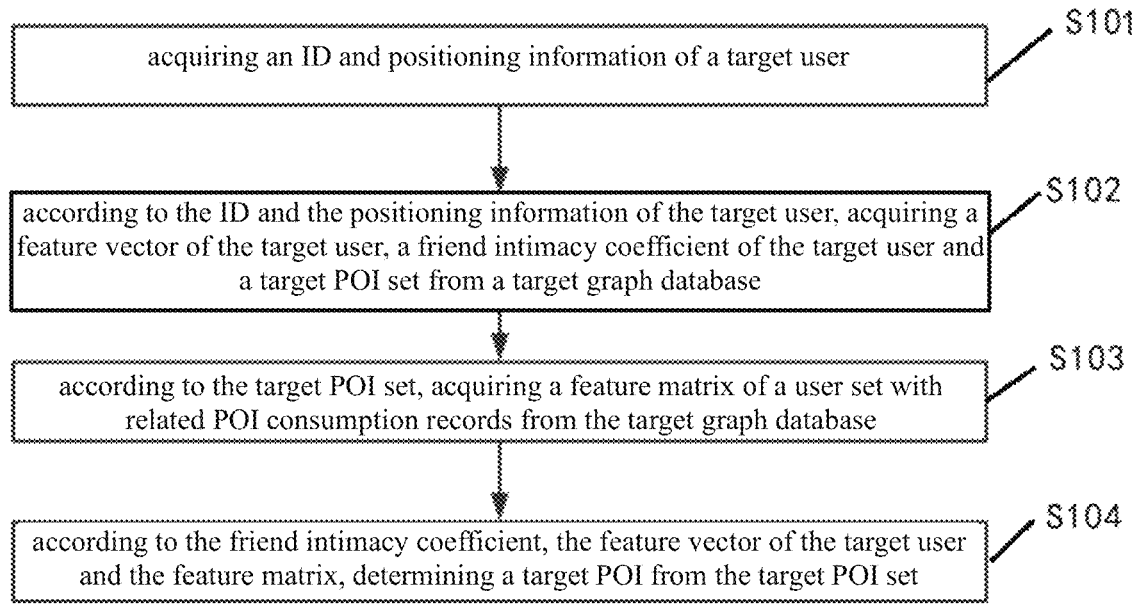
FIG. 1 is a flowchart of a POI recommendation method based on a graph database according to the present invention.

As shown in FIG. 1, the POI query method based on the distributed graph database specifically includes the following steps:

S101: different grid IDs corresponding to each POI are acquired, wherein each grid ID of each POI corresponds to one grid level;

S102: a mapping relationship from each POI to different grid IDs is built and the mapping relationship is cached in the graph database;

S103: target geographic coordinates are received and a target geographic coverage area is acquired according to the target geographic coordinates;

S104: a grid ID set of the target geographic coverage area is acquired according to a preset target grid level; and S105: according to the mapping relationship from each POI to different grid IDs, a POI set corresponding to the grid ID set is queried from the graph database.

The POI query method based on the distributed graph database according to the embodiment is applied to a business system. The business system operates in a server and is configured to provide service for a remote terminal.

The above graph database is configured to store POI data and geographic position corresponding to the POI. In this embodiment, a distributed database Nebula Graph based on an open source is adopted as the graph database; and in other embodiments, other graph databases may be adopted. The selection of the specific graph database does not affect the execution of the method provided by the present invention, so the graph database is not specifically limited.

One graph in the graph database Nebula Graph consists of the following two graph elements:
(1) a node and an attribute of the node; and
(2) a relationship and an attribute of the relationship.

In the practical application, the node and the relationship have a plurality of attributes, which are usually used to describe the attributes of the node and the relationship, wherein a suspension edge refers to that nodes connected to two ends of one relationship are not established, and may be called a suspension relationship.

According to the POI query method based on the distributed graph database provided by the embodiment, when different grid IDs corresponding to each POI are solved, based on a principle of cutting the surface of the earth into grids according to different cutting levels, each cutting level (that is, the grid level) consists of different sizes of square cells, so a cell level determines the precision of the grid, and the higher the grid level is, the more the grids are. A unique ID is endowed to each grid, that is, grid ID. The latitude and longitude coordinates on each map correspond to a series of grid IDs capable of covering the latitude and longitude coordinates under different grid levels. Therefore, one POI will correspond to different grid IDs according to the latitude and longitude coordinates of the POI on the map (geographic position information).

According to the different grid IDs corresponding to each POI, a mapping relationship from each POI to different grid IDs is respectively built, and then the mapping relationship is cached in the graph database, that is a relationship network formed by the mapping relationship is written into the graph database.

After the mapping relationship is written into the graph database, target geographic coordinates are received and are transmitted by a terminal. The terminal may be intelligent devices with a GPS function and a network transmission function such as a mobile phone, a smart watch, a tablet computer and the like. Life service applications such as taxi-hailing, food recommendation and the like may be installed on the terminal. A user may use the GPS positioning function or the manual input geographic position in the application to acquire the target geographic position coordinates. The business system receives the target geographic coordinates and may calculate an area covering the target geographic coordinates according to the target geographic coordinates to acquire a target geographic coverage area, that is, geographic areas at the periphery of the target geographic coordinates are spliced to form the target geographic coverage area.

Since different life service applications have different requirements on the positioning precision, the business system will preset grid levels corresponding to different applications according the different applications to acquire a grid ID set of the target geographic coverage area, that is, the grid IDs which meet the preset gateway coverage level in the target coverage area form a set.

Finally, the POIs having a mapping relationship with the grid ID in the grid ID set are queried from the graph database through graph traversal to form a POI set. The POI set is the POI near the target geographic coordinates, thereby querying the nearby POI.

It should be noted that the higher the grid level is, the more the grids are divided, so the slower the search and calculation will be; furthermore, it is meaningless to use the centimeter-level grid level for the local life service applications connected to the business system, so the target grid level selected by the embodiment is about between 7 km and 27 m, thereby ensuring the balance of the requirements of the business scenarios (different life service applications) and the performance of the database.

In this embodiment, the graph and geographic position information containing the POI is stored in one database service simultaneously by storing the mapping relationship between the POI and the grid ID in the graph database, so that the consistency of data can be ensured, and the problem of storage redundancy caused by storing interactive data by two database services can be avoided. When the nearby POI is queried, since it only involves interaction with one database, the interaction times are reduced, thereby reducing the processing delay of the business system, increasing the speed of searching the nearby POI and improving the user experience.

Preferably, the step: different grid IDs corresponding to each POI are acquired, includes: based on a geographic geometry library, the grid ID of each POI under different grid levels is calculated to acquire different grid IDs corresponding to each POI, wherein the grid level and the grid IDs under different grid levels are pre-defined by the geographic geometry library.

This embodiment adopts a Google S2 geographic geometry library based on a Google open source, the grid ID of each POI under different grid levels is calculated on the basis of the Google S2 geographic geometry library by the algorithm of the geographic geometry library. By the level (equal to the above grid level) capable of dividing the surface of the earth into 30 levels, each level having different sizes of square cells (equal to the above grid), the Google S2 will give a unique identifier to each cell in advance, that is, the grid ID. Therefore, once one level is selected, the google s2 divides the entire surface of the earth into a series of cells, and the google s2 gives a unique ID (grid ID) to each cell. If the selected level is equal to 20, the area covered by one cell is about 77.32 square meters.

Due to different levels, the same latitude and longitude coordinates will fall into different cells based on different levels. The level determines the precision of the cell. Each geographic point will fall into one cell, for example, if a merchant 5 km away from a point at a certain geographic position is evaluated, it is necessary to specify the level and then evaluate a combination of all nearby cells (all the cells may be spliced into an approximate circle) under the level. Therefore, one latitude and longitude coordinate (geographic point) is given, such as (30.28522 120.01338), and the grid ID covering the point may be calculated on the basis of the Google S2 geographic geometry library. Due to different levels covering the grid, a series of grid IDs capable of covering the point may be acquired through calculation, such as cell id 1, cell id2 and the like, and each grid ID corresponds to the level of one google s2.

Due to the use of the Google S2 geographic geometry library, there are totally 30 grid levels. However, considering the actual business application of the present invention, the grid level selected by the embodiment is about between 7 km and 27 m, the minimum grid level corresponding to the Google S2 is 10, and the maximum grid level is 18. Since different types of life service applications have different requirements on the positioning precision, for example, the requirements on the positioning precision by the two geographic position query requests of "taxi-hailing" and "nearby snack" are definitely different. Therefore, the business system presets different grid levels (the above target grid) for different life service applications, between 10 and 18.

Since the algorithm of singly calculating the google s2 for one time wastes calculation resources, when the number of the POIs is limited and the coordinates of the POIs do not change (generally, the coordinates of the merchants providing local life service do not change), to reduce the calculation time, the mapping relationship from the POI to different grid IDs is cached in the graph database so as to realize real-time query access, avoid online real-time calculation and improving query efficiency.

Preferably, the step: a mapping relationship from each POI to the different grid IDs is built and the mapping relationship is cached into the graph database, specifically includes the following steps: each POI is taken as a POI node of the graph database respectively; different grid IDs corresponding to each POI are taken as grid nodes of the graph database respectively; and a mapping relationship is built between each POI node and different grid nodes corresponding to each POI, wherein the attribute of the mapping relationship is a grid level.

For example, the level selected by one latitude and longitude coordinate (30.28522 120.01338) in the present application is 10-18, then it may be understood that cell id10 of the corresponding level 10 calculated by google s2 is 1298739451, and cell id11 of the corresponding level 11 calculated by google s2 is 1312312313. That is, one POI node corresponds to a plurality of grid nodes, and the relationship between the POI node and the corresponding grid is a gateway level Preferably, the step: a mapping relationship from each POI to the different grid IDs is built and the mapping relationship is cached into the graph database, specifically includes the following steps: each POI and the corresponding different grid IDs respectively form a suspension relationship and are stored in an independent graph space.

Besides geographic coordinates, the POI usually has a series of other attributes, such as name. It is unnecessary to store different attributes of the POI into two graph spaces, so a suspension edge stores the attributes of the POI into the same graph space. Secondly, according to the distributed design principle of the distributed database Nebula Graph, an outgoing edge and a starting point are stored in the same partition of the same server, so that one-time remote network request can be avoided and it is helpful to save network resources.

Preferably, the step: target geographic coordinates are received and a target geographic coverage area is acquired according to the target geographic coordinates, includes: the target geographic coverage area of the target geographic coordinates is calculated according to a preset coverage mode, wherein the coverage mode includes circular coverage or polygonal coverage.

Preferably, the step: the target geographic coverage area of the target geographic coordinates is calculated according to a preset coverage mode, includes: circle center coordinates and a radius are acquired when the target geographic coverage area of the target geographic coordinates is calculated according to the circular coverage mode, and the target geographic coverage area is built according to the circle center coordinates and the radius; or coordinates of each vertex of a polygon are acquired when the geographic coverage area of the geographic coordinates are calculated according to the polygonal coverage mode, and the target geographic coverage area is built according to the coordinates of each vertex.

The business system may preset coverage modes for the applications so as to obtain different shapes of target coverage areas in actual application.

Preferably, the step: a grid ID set of the target geographic coverage area is acquired according to a preset target grid level, includes: a grid ID of the target geographic coverage area is calculated based on the geographic geometry library and according to the preset target grid level, wherein the geographic geometry library is google s2, the geographic geometry library pre-defining 30 grid levels, and each geographic coordinate has a grid ID in each grid level.

In this embodiment, the grid set of the target geographic coverage area is calculated on the basis of the google s2 geographic geometry library to acquire the grid ID set, and the POI having the mapping relationship with the grid ID may be traversed in the graph database through the grid ID in the grid ID set, thereby realizing POI query.

Figure 3:
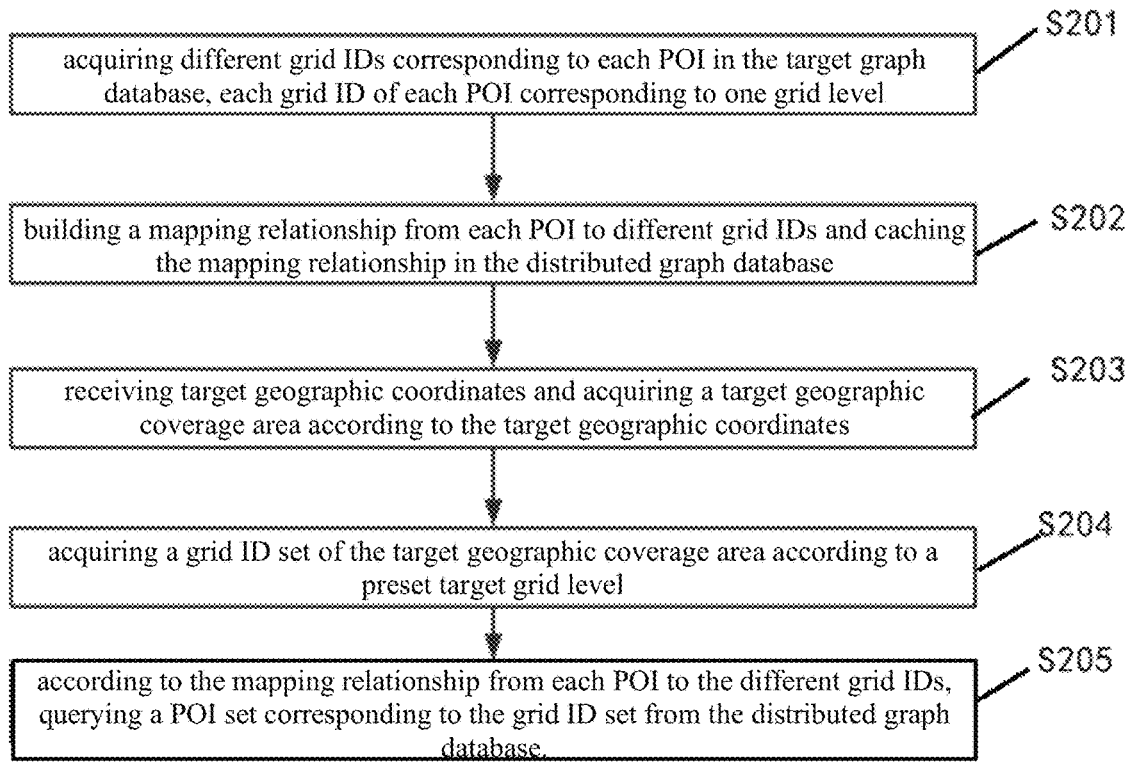
FIG. 3 is a POI query method based on a distributed graph database according to the present invention.

As shown in FIG. 3, the embodiment further provides a POI recommendation method based on a graph database, which is intended to solve the problem that an existing POI recommendation method cannot realize personalized recommendation. The POI recommendation method based on the graph database specifically includes the following steps:

S201: an ID and positioning information of a target user are acquired.

S202: according to the ID and the positioning information of the target user, a feature vector of the target user, a friend intimacy coefficient of the target user and a target POI set are acquired from a target graph database, wherein the feature vector of the target user consists of personal data of the target user, the personal data of the target user includes user information and preference information, and the target POI set is a set composed of POIs within a preset distance range queried according to the positioning information.

S203: a feature matrix of a user set with related POI consumption records is acquired from the target graph database according to the target POI set, wherein the related POI consumption records are consumption records associated with any POI in the target POI set, the feature matrix consists of personal data of each user in the user set, and the personal data of each user includes personal information and preference information.

S204: according to the friend intimacy coefficient, the feature vector of the target user and the feature matrix, a target POI is determined from the target POI set.

The POI recommendation method based on the graph database according to the embodiment is applied to a business system. The business system operates in a server. At present, most of POI recommendation on the market are based on the public grading way, which is the same recommendation content for all consumption. In this embodiment, POI recommendation that meets consumption and positioning is made according to different interests and preferences of different consumers.

Personalized recommendation of POI is realized on the basis of a large number of historical data of related users and merchants. At present, the massive data accumulated over years is generally stored in the data warehouse in a PB recording mode, but the data storage format of the data warehouse is not suitable for building a relationship network of data and does not have the ability of rapidly processing massive data, that is, it does not have the large-scale concurrent execution ability; therefore, based on the data of users and merchants stored in the existing data warehouse, reliable POI personalized recommendation cannot be realized, and the requirements of high concurrency and high calculation quantity cannot be met.

In this embodiment, to realize the personalized recommendation of POI and meet the requirements of high concurrency and high calculation quantity, massive user and merchant data is stored by the graph database, a relationship network of the data is built, data is acquired through graph traversal, and the data processing requirements of high concurrency and high calculation quantity are met, thereby rapidly reading and calculating data and achieving the effects of reducing time delay and improving the concurrency execution ability.

Therefore, in some embodiments, this embodiment needs to build the graph database for storing data and building the relationship network of the data. That is, the target data is imported into a pre-built graph database to acquire a target graph database. Specifically, the building step may include: target data in a data warehouse is acquired, wherein the target data includes POI data, user data and an association relationship between the POI data and the user data; the target data is processed into graph elements of a graph database; batched tasks are built and the graph elements are converted into a file format of the graph database in batches to acquire a graph element file; and the graph element file is pulled from the data warehouse to a graph database server corresponding to the graph database and is ingested into the graph database to acquire a target graph database.

In this embodiment, related data and a data relationship are stored by the open source-based distributed database Nebula Graph; and in other embodiments, other graph databases may be used for storing a relationship between data. One graph in the graph database consists of the following two graph elements:

(1) a node and an attribute of the node; and (2) a relationship and an attribute of the relationship.

Figure 2:
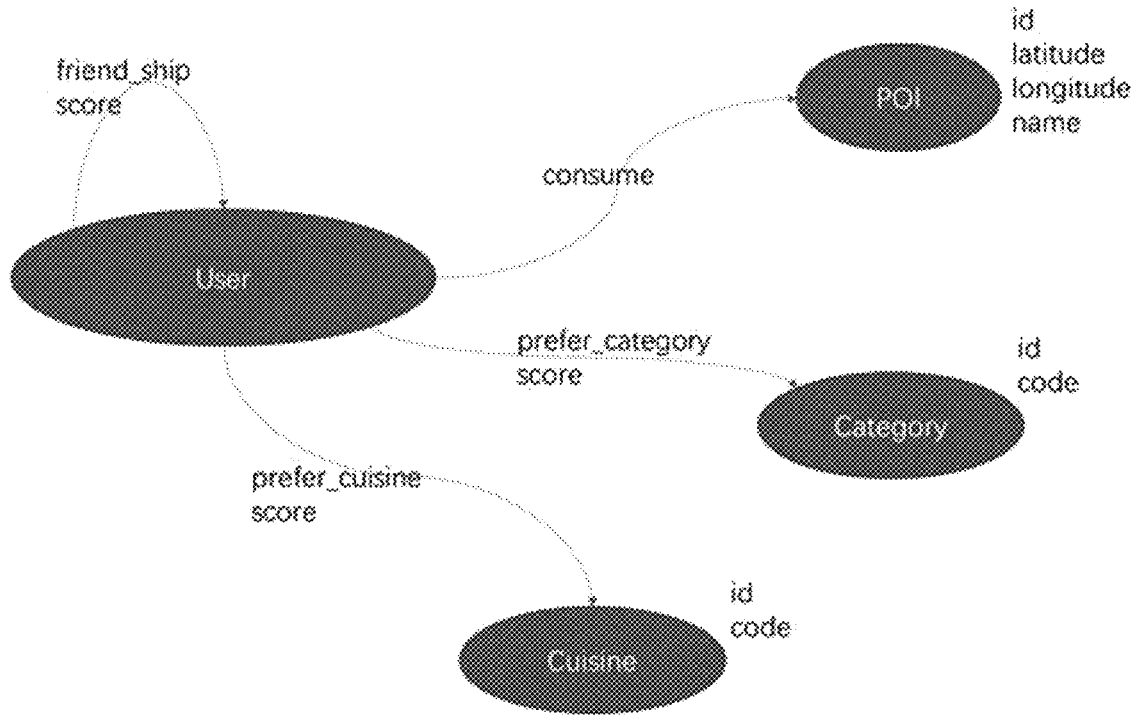
FIG. 2 is a composition design diagram of a graph database in an embodiment 1.

In this embodiment, as shown in FIG. 2, four types of nodes are designed:

User (consumer): the attributes are id (number), province_name (province or city), consumption_level (consumption level label) and gender;

POI (merchant): the attributes are id (number), latitude, longitude, name (merchant name);

Category (commodity type): the attributes are id (number), code (type code);

Cuisine (food type): the attributes are id (number), code (type code).

Four types of relationships are:

friend_ship (User→User): the attribute is score, indicating credibility or intimacy between consumers, the higher the score, the higher the recommendation weight;

consume(User→POI): no attribute, indicating that there is historical consumption records between consumers and merchants;

prefer_category(User→category): the attribute is score, indicating the preference degree of the consumer on a certain commodity; and prefer_cuisine(User→cuisine): the attribute is score, indicating the preference degree of the consumer on a certain food.

It should be noted that the two types of nodes Category and Cuisine may be scenic spot types (natural scenery, theme park, historic culture, etc.) or movie styles (scientific fiction film, literary film, etc.) or cuisines (Cantonese cuisine, Hunan cuisine, etc.) in other application scenarios of the present invention, which are not further limited here. In addition, the attributes of the nodes and the relationship are only schematic. In other application scenarios of the present invention, the user attribute may include more information (age, family status, etc.), and the consume relationship may be the amount and time of historical consumption at each time.

After the graph database is built, it is necessary to import historical consumption data (the consumption record of the user completed in POI), a user relationship, user preference and other data stored in the data warehouse into the graph database, and data is stored in the data warehouse in the form of table or file, so it is necessary to process the data in the data warehouse and convert the data into the graph element of the built graph database for importing. However, the data importing time is the key. Usually, large business systems have billion-level graph nodes and ten billion to hundred billion-level graph relationships. Calculated according to the 500-byte length of one graph element, the storage quantity is about 50 TB. If the data is written into the graph database through database query language, it takes about tens of hours. Preferably, to shorten the time of writing data into the graph database and improving the data importing efficiency, this embodiment adopts sst ingest to complete data import. Specifically, the step: data is acquired and is imported into a pre-built graph database, includes:

target data in a data warehouse is acquired, wherein the target data includes POI data, user data and an association relationship between the POI data and the user data; the target data is processed into graph elements of a graph database; batched tasks are built through Spark job and the graph elements are converted into a file format sst of the graph database in batches to acquire a graph element file with an sst format; and the graph element file with the sst format is pulled from the data warehouse to a corresponding graph database server and is ingested into the graph database.

It should be noted that the above data may be full data and incremental data, and the import of the full data and the import of the incremental data may reuse the above import logic. The above Spark is a big data processing framework commonly used in the field, and large-scale concurrency data processing and calculation tasks may be completed through Spark job.

Compared with the query language writing method, the above sst ingest has the following advantages:

a. CPU resource in the data warehouse may be fully utilized, the file content is serialized and calculated in advance and is entirely compressed, and high compression ratio is achieved.

b. Usually, before data is written, the data warehouse needs to perform ETL on data, such as the process of processing and counting the scores, commodity preference and the like. The process may be combined with the sst file generation process, thereby reducing the number of the tasks of the data warehouse.

c. Multiple pieces of data may be prepared in the data warehouse in advance, the incremental data of T+1 may be prepared simultaneously, and the import of the full data and the import of the incremental data may reuse the same logic.

d. The data preparation work of the data warehouse does not affect the online external service of the graph database and may start only after waiting for completion of upstream data ETL. Data import may be performed when the business of the graph database is at a low ebb (generally before dawn), the import time is more flexible.

e. The process of pulling the sst file into the server where the graph database is located will not affect the external service of the graph database and has little impact on the business.

After the business system completes data import of the graph database, the ID and the positioning information of the target user transmitted through APP and other client sides may be received, the business system invokes one user-defined function (UDF) or storage process according to the ID and the positioning information. The step: according to the ID and the positioning information of the target user, a feature vector of the target user, a friend intimacy coefficient of the target user and a target POI set are acquired from the graph database, specifically includes the following steps:

personal data of the target user and the friend intimacy coefficient of the target user are queried according to the ID of the target user, wherein the personal data of the target user includes user information and preference information;

the feature vector of the target user is formed by the personal data of the target user; and POI within a preset distance range is queried according to the positioning information, and the target POI set is formed by the POI in the preset distance range.

It should be noted that the above user-defined function (UDF) and the storage process are user-defined database query statements, and these statements are compiled and optimized in advance and is built in the graph database, thereby reducing the interaction times between the database and an invoking program.

Specifically, the graph database queries the attribute of the node corresponding to an ID according to the ID, that is, personal information A1 (province, consumption level and gender) of the target user. The specifically adopted query statements are:

$A1=FETCH PROP ON % d YIELD User.province_name, User.consumption_level, User.gender, wherein % d is the id of the target user and is a parameter transmitted by the business system.

The preference information A2 and A3 of the target user are queried according to the ID, wherein A2 specifically represents the commodity and scores preferred by the target user, and A3 specifically represents food and scores preferred by the target user. Specifically, the adopted query states are:

$A2=GO FROM % d OVER prefer_category YIELD prefer_category._dst ASprefer_id, prefer_category.score; and $A3=GO FROM % d OVER prefer_cuisine YIELD prefer_cuisine._dst ASprefer_id, prefer_cuisine.score AS score.

In this embodiment, according to the storage characteristic of Nebula Graph, the query process of A2 and A3 is optimized:

The ID of the node in the Nebula Graph is stored on an edge in the form of_src and _dst attributes. In particular, since a terminal point and the edge are generally stored on two servers, acquiring the ID of the terminal point through prefer_category._dst may avoid data acquisition from a remote server.

Then the above A1, A2 and A3 form the feature vector X of the target user:

$$X = \begin{bmatrix} A1^T \\ A2^T \\ A3^T \end{bmatrix}.$$

Of course, if more user information is designed when the graph element in the graph database is built, the feature vector has more elements.

In addition, according to the ID of the target user, the friend intimacy coefficient of the target user can be acquired from the graph database, that is, the intimacy coefficient between the target user and each friend. The specific query statements are:

$a=GO FROM % d OVER friend_ship YIELD friend_ship.score.

According to the positioning information of the target user, the target POI set P is acquired from the graph database. The positioning information in this embodiment includes latitude and longitude, and the specific query states are:

$POI=GO FROM func_near (% latitude, % longitude, % distance) OVER poi_location YIELD poi_location._dst AS mid, wherein % latitude and % longitude are latitude and longitude, and % distance is a preset distance range. In this embodiment, the preset distance range is 5 KM, and the POI set in the 5 KM range may be acquired from the graph database to serve as the target POI set P. Of course, in other embodiments, the preset distance range may be self-defined according to the specific situation, which is not specifically limited here.

Preferably, the business system invokes the user-defined function (UDF) or the storage process. The step: according to the above target POI set P, a feature matrix of a user set with related POI consumption records is acquired from the graph database, includes the following steps:

users with related POI consumption records are queried according to the target POI set, and a user set is formed by the users with the related consumption records, wherein the related POI is any POI in the target POI set;

personal data of each user in the user set is sequentially acquired and a first feature vector is sequentially formed by the personal data of each user, wherein the personal data of each user includes personal information and preference information; and a feature matrix is formed by the first feature vector of each user in the user set to acquire a feature matrix of the user set, wherein each column of element in the feature vector is the first feature vector of one user in the user set.

Preferably, the step: a user set is formed by users with related POI consumption records and is processed, includes: each user in the user set is de-duplicated.

Specifically, users who had consumption records in the POI in the set P are acquired on the basis of the target POI set P to form a user set Users. In this embodiment, since the data of the same user does not need to occur in the feature matrix Y built later for twice, the user in the user set Users is de-duplicated, that is, the users with the same id in the user set Users are de-duplicated. The specific de-duplication processing adopts the de-duplication function of the graph database Nebula Graph.

The step: personal data of each user in the user set Users is acquired, includes: personal information B1 of each user in the user set Users is queried.

The step: preference information of each user in the user set Users is queried, includes: commodity and score B2 that each user once consumed and food and score B3 that each user once consumed.

A first feature vector is formed by personal data of each user in the user set Users, and a feature matrix Y is formed by a feature vector of each user of the user set Users:

$$Y = \begin{bmatrix} B1^T \\ B2^T \\ B3^T \end{bmatrix},$$

Wherein each column of elements in Y represents a first feature vector of one user in the user set Users.

Preferably, the step: according to the friend intimacy coefficient, a similarity of the feature vector of the target user and the feature matrix is calculated, includes:

according to a similarity calculation function, a similarity of the feature vector of the target user and the feature matrix is calculated, wherein a similarity calculation formula is as follows:

$$sim(\alpha, X, Y) = \alpha \times \frac{\sum_{i=1}^{n}(x_i \times y_i)}{\sqrt{\sum_{i=1}^{n}(x_i)^2} \times \sqrt{\sum_{i=1}^{n}(y_i)^2}},$$

X representing the feature vector of the target user, Y representing the feature matrix, α being the friend intimacy coefficient of X and Y, Xi being the $i^{th}$ element in X, and yi being the $i^{th}$ column of element in Y.

A proximity between other users who have consumed POI in the preset range and the target user is acquired by calculating the similarity of the feature vector X of the target user and the feature matrix Y of the user set, so that the preferred POI of other users with the highest proximity is recommended to the target user and the recommended POI meets the preference of the target user, thereby realizing personalized recommendation and meeting the requirements of different users.

Preferably, the step: the business system determines the target POI from the target POI set according to each of the similarities, includes: the similarity result is stored in a descending order and the top n users in the similarity order are selected; and the POI which is consumed most by the top n users in the order is queried to output the target POI.

Firstly, the similarity result is sorted in a descending order, and other users with the most similar preference (with the highest proximity with the target user) are found, wherein other users are users in the above user set, and sorting is realized specifically by the |ORDER BY $-.Z statement. In this embodiment, the top five users in the similarity order in the user set are selected as users meeting the recommendation requirements, specifically adopting |LIMIT 5; and then the POI which is consumed most by the top five users is output as the target POI, and the target POI is queried.

Of course, in other embodiments, the number of selected the users may be defined according to the specific situation, that is, n may be set freely, which is not specifically limited here.

The business system returns the target POI to a client side, thereby completing POI personalized recommendation.

According to the POI recommendation method based on the graph database provided by the embodiment, consumption data, social data and preference data of the users are stored and traversed by the graph database, and the personalized recommendation of the POI is completed by combining with the real-time geographic position, thereby meeting the personalized requirements of the users. Furthermore, by depending on the dynamic expansion capability of the graph database itself, the present invention has high elastic expansion capability and can reasonably utilize the server resource, thereby avoiding waste of the server resources.

In other embodiments, the difference from the above embodiments is that to achieve the high-concurrency and low-delay target of the POI recommendation, the process of querying data from the graph database and acquiring the target POI is compiled and optimized by the user-defined function (UDF) or the storage process and is built in the graph database, and the intermediate result obtained through query and calculation does not need to be transmitted back to the business system and is directly cached in the graph database. Only the acquired target POI is returned to the business system, thereby avoiding massive data interaction caused by reciprocation between the business system and the graph database and greatly improving the access performance.

Therefore, in this embodiment, the POI recommendation method based on the graph database, as shown in FIG. 3, includes the following steps: the business system acquires data and imports the data into a pre-built graph database, wherein the data includes POI data, user data and an association relationship between the POI data and the user data; the business system receives an ID and positioning formation of the target user; the business system transmits the ID and the positioning information of the target user to the graph database; the business system receives the target POI returned by the graph database; and the business system returns the target POI to the client side.

The step: the graph database acquires the target POI and returns the target POI, includes: according to the ID and the positioning information of the target user, a feature vector of the target user, a friend intimacy coefficient of the target user and a target POI set are acquired, wherein the feature vector of the target user consists of the personal data of the target user; according to the target POI set, a feature matrix of the user set with related POI consumption records is acquired, wherein the related POI consumption records are consumption records associated with any POI in the target POI set, and the feature matrix consists of the personal data of each user in the user set; according to the friend intimacy coefficient, a similarity of the feature vector of the target user and the feature matrix is calculated; according to each of the similarities, the target POI is determined from the target POI set; and the target POI is returned.

Specifically, the graph database queries the attribute of the node corresponding to an ID according to the ID, that is, personal information A1 (province, consumption level and gender) of the target user. The specifically adopted query statements are:

$A1=FETCH PROP ON % d YIELD User.province_name, User.consumption_level, User.gender, wherein % d is the id of the target user and is a parameter transmitted by the business system.

The preference information A2 and A3 of the target user are queried according to the ID, wherein A2 specifically represents the commodity and scores preferred by the target user, and A3 specifically represents food and scores preferred by the target user.

In this embodiment, according to the storage characteristic of Nebula Graph, the query process of A2 and A3 is optimized:

The ID of the node in the Nebula Graph is stored on an edge in the form of_src and _dst attributes. In particular, since a terminal point and the edge are generally stored on two servers, acquiring the ID of the terminal point through prefer_category._dst may avoid data acquisition from a remote server.

Then the above A1, A2 and A3 form the feature vector X of the target user:

$$X = \begin{bmatrix} A1^T \\ A2^T \\ A3^T \end{bmatrix}.$$

Of course, if more user information is designed when the graph element in the graph database is built, the feature vector has more elements.

In addition, according to the ID of the target user, the friend intimacy coefficient of the target user can be acquired from the graph database, that is, the intimacy coefficient between the target user and each friend. The specific query statements are:

$a=GO FROM % d OVER friend_ship YIELD friend_ship.score.

According to the positioning information of the target user, the target POI set P is acquired from the graph database. The positioning information in this embodiment includes latitude and longitude, and the specific query states are:

$POI=GO FROM func_near (% latitude, % longitude, % distance) OVER poi_location YIELD poi_location._dst AS mid, wherein % latitude and % longitude are latitude and longitude, and % distance is a preset distance range. In this embodiment, the preset distance range is 5 KM, and the POI set in the 5 KM range may be acquired from the graph database to serve as the target POI set P. Of course, in other embodiments, the preset distance range may be self-defined according to the specific situation, which is not specifically limited here.

Preferably, the step: the graph database acquires the feature matrix of the user set with related POI consumption records according to the above target POI set, includes the following steps:

users with related POI consumption records are queried according to the target POI set, and a user set is formed by the users with the related consumption records, wherein the related POI is any POI in the target POI set;

personal data of each user in the user set is sequentially acquired and a first feature vector is sequentially formed by the personal data of each user, wherein the personal data of each user includes personal information and preference information; and a feature matrix is formed by the first feature vector of each user in the user set to acquire a feature matrix of the user set, wherein each column of element in the feature vector is the first feature vector of one user in the user set.

Preferably, the step: the graph database forms a user set by users with related POI consumption records and processes the user set, includes: each user in the user set is de-duplicated.

Specifically, users who had consumption records in the POI in the set P are acquired on the basis of the target POI set P to form a user set Users. In this embodiment, since the data of the same user does not need to occur in the feature matrix Y built later for twice, the user in the user set Users is de-duplicated, that is, the users with the same id in the user set Users are de-duplicated. The specific de-duplication processing adopts the de-duplication function of the graph database Nebula Graph.

The step: personal data of each user in the user set Users is acquired, includes: personal information B1 of each user in the user set Users is queried.

The step: preference information of each user in the user set Users is queried, includes: commodity and score B2 that each user once consumed and food and score B3 that each user once consumed.

A feature vector is formed by personal data of each user in the user set Users, and a feature matrix Y is formed by a feature vector of each user of the user set Users:

$$Y = \begin{bmatrix} B1^T \\ B2^T \\ B3^T \end{bmatrix},$$

wherein each column in Y represents a feature vector of one user in the user set Users.

Preferably, the step: a similarity of the feature vector of the target user and the feature matrix is calculated, includes:

according to a similarity calculation function, a similarity of the feature vector of the target user and the feature matrix is calculated, wherein a similarity calculation formula is as follows:

$$sim(\alpha, X, Y) = \alpha \times \frac{\sum_{i=1}^{n}(x_i \times y_i)}{\sqrt{\sum_{i=1}^{n}(x_i)^2} \times \sqrt{\sum_{i=1}^{n}(y_i)^2}},$$

X representing the feature vector of the target user, Y representing the feature matrix, α being the friend intimacy coefficient of X and Y, Xi being the $i^{th}$ element in X, and yi being the $i^{th}$ column of element in Y.

A proximity between other users who have consumed POI in the preset range and the target user is acquired by calculating the similarity of the feature vector X of the target user and the feature matrix Y, so that the preferred POI of other users with the highest proximity is recommended to the target user and the recommended POI meets the preference of the target user, thereby realizing personalized recommendation and meeting the requirements of different users.

Preferably, the step: the graph database determines the target POI from the target POI set according to each of the similarities, includes: the similarity result is stored in a descending order and the top n users in the similarity order are selected; and the POI which is consumed most by the top n users in the order is queried to acquire the target POI.

Firstly, the similarity result is sorted in a descending order, and other users with the most similar preference (with the highest proximity with the target user) are found, and sorting is realized specifically by the |ORDER BY $-.Z statement. In this embodiment, the top five users in the similarity order in the above user set are selected as users meeting the recommendation requirements, specifically adopting|LIMIT 5; and then the POI which is consumed most by the top five users is output as the target POI, and the target POI is queried:

Of course, in other embodiments, the number of selected the users may be defined according to the specific situation, that is, n may be set freely, which is not specifically limited here.

It may be understood that in some embodiments, in the step S202, when the target POI set is acquired from the target graph database according to the positioning information, the target POI set may be rapidly acquired by the method in the embodiment shown in FIG. 1.

Figure 4:
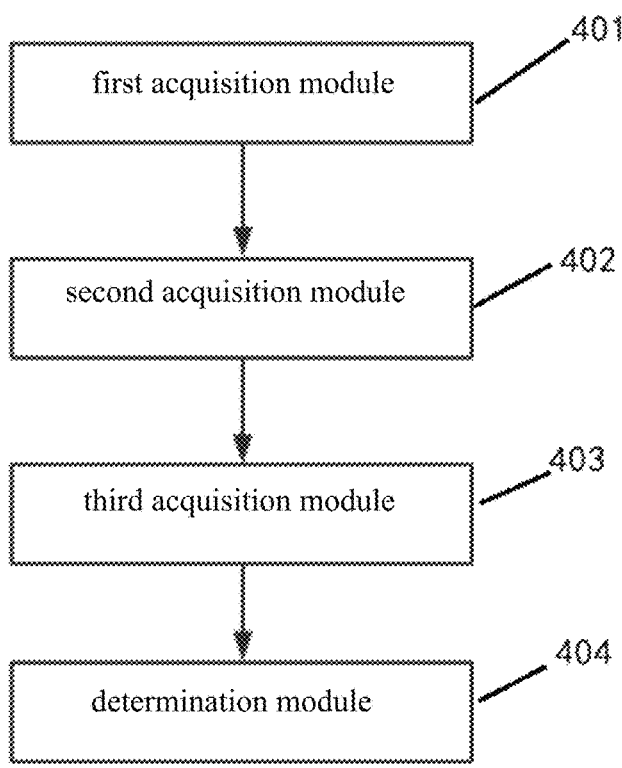
FIG. 4 is a structural diagram of a POI recommendation device based on a graph database according to the present invention.

As shown in FIG. 4 which is a POI recommendation device based on a graph database, the device includes: a first acquisition module 401, a second acquisition module 402, a third acquisition module 403 and a determination module 404.

The first acquisition module 401 is configured to acquire an ID and positioning information of a target user.

The second acquisition module 402 is configured to acquire a feature vector of the target user, a friend intimacy coefficient of the target user and a target POI set from a target graph database according to the ID and the positioning information of the target user, wherein the target POI set is a set composed of POIs within a preset distance range queried according to the positioning information.

The third acquisition module 403 is configured to acquire a feature matrix of a user set with related POI consumption records from the target graph database according to the target POI set, wherein the related POI consumption records are consumption records associated with any POI in the target POI set.

The determination module 404 is configured to determine a target POI from the target POI set according to the friend intimacy coefficient, the feature vector of the target user and the feature matrix.

Figure 5:
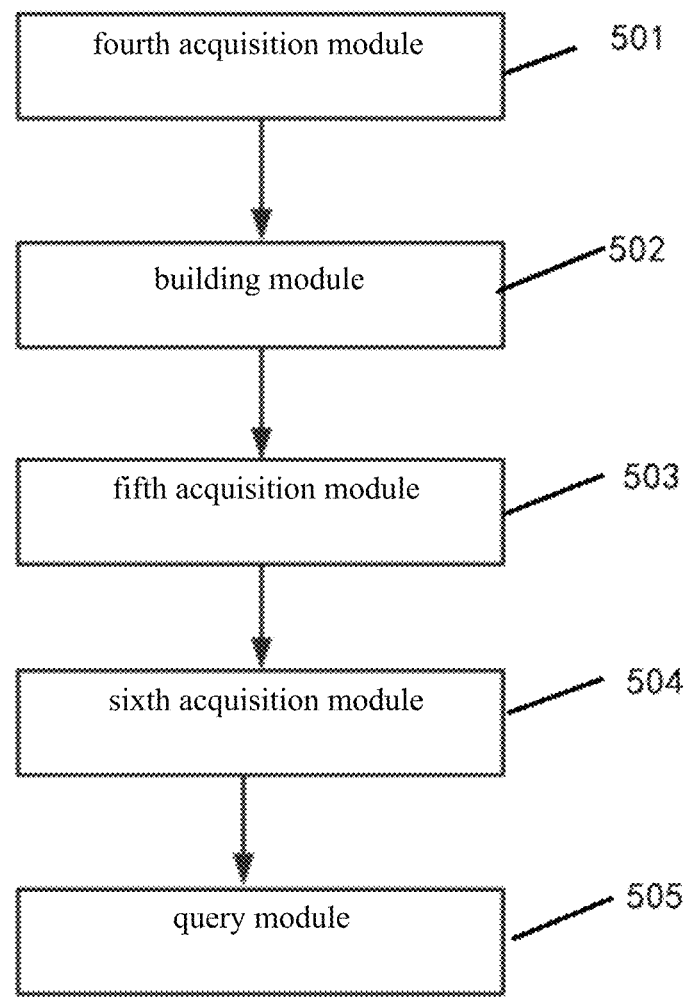
FIG. 5 is a structural diagram of a POI query device based on a distributed graph database according to the present invention.

As shown in FIG. 5 which is a structural diagram of a POI query device based on a distributed graph database according to some embodiments of the present application, the device includes: a fourth acquisition module 501, configured to acquire different grid IDs corresponding to each POI, wherein each grid ID of each POI corresponds to one grid level; a building module 502, configured to build a mapping relationship from each POI to different grid IDs and caching the mapping relationship in the graph database; a fifth acquisition module 503, configured to receive target geographic coordinates and acquire a target geographic coverage area according to the target geographic coordinates; a sixth acquisition module 504, configured to acquire a grid ID set of the target geographic coverage area according to a preset target grid level; and a query module 505, configured to query a POI set corresponding to the grid ID set from the graph database according to the mapping relationship from each POI to different grid IDs.

The embodiment of the present application further provides an electronic device, including a processor, a storage medium and a computer program, wherein the computer program is stored in the storage medium; and the computer program, when being executed by the processor, enables the process to implement the POI recommendation method based on the graph database as defined in any one of the above.

The embodiment of the present application further provides an electronic device, including a processor, a storage medium and a computer program, wherein the computer program is stored in the storage medium; and the computer program, when being executed by the processor, enables the process to implement the POI query method based on the distributed graph database as defined in any one of the above.

The above units described as separated components may be or may not be physically separated, and components displayed as units may be or may not be physical units; they may be located in one placed and may also be distributed on a plurality of network units; and part of all of the units may be selected according to the actual requirements to achieve the aim of the solution of the embodiment.

In addition, each functional unit in each embodiment of the present invention may be all integrated in one processing unit, each unit may singly serve as a unit, and two or more than two units may be integrated in one unit; and the above integrated units may be realized in the form of hardware, and may also be realized in the form of hardware and software functional units.

Those of ordinary skill in the art may understand that all or part of steps for implementing the above method embodiments may be completed by instructing related hardware through a program; the program may be stored in a computer readable storage medium, and performs the steps of the above method embodiments when being executed; and the aforementioned storage medium includes: various mediums capable of storing program codes, such as a mobile storage device, a read-only memory (ROM), a random access memory (RAM), a magnetic disk or an optical disk, etc.

Or if the above integrated unit of the present invention is implemented in the form of a software functional module and is sold or used as an independent product, the unit may be stored in one computer readable storage medium. Based on this understanding, the technical solution of the embodiments of the present invention essentially or a part contributing to the prior art may be embodied in the form of a software product; and the computer software product is stored in one storage medium and includes a plurality of instructions configured to enable one computer device (may be a personal computer, a server or a network device, etc.) to perform all or part of the method in each embodiment of the present invention. The aforementioned storage medium includes: various mediums capable of storing program codes, such as a mobile storage device, an ROM, an RAM, a magnetic disk or an optical disk, etc.

The above is only the specific embodiments of the present invention, but the protection scope of the present invention is not limited to this. Any changes or substitutions that may be easily conceived by those skilled in the art within the technical scope disclosed by the present invention should be covered within the protection scope of the present invention. Therefore, the protection scope of the present invention shall be subjected to the protection scope of the claims.

What is claimed is:

1. A POI recommendation method based on a graph database, comprising the following steps:
   acquiring data, and importing the data into a pre-constructed graph database, wherein the data comprises POI data, user data and an incidence relation between the POI data and the user data;
   receiving ID and positioning information of a target user;
   acquiring a feature vector of the target user, a friend intimacy coefficient of the target user and a target POI set from the graph database according to the ID and the positioning information of the target user, wherein the feature vector of the target user is composed of personal data of the target user, the personal data of the target user comprises user information and preference information, and the target POI set is a set composed of POIs in a preset distance range inquired acquiring to the positioning information;

acquiring a feature matrix of a user set with related POI consumption records from the graph database according to the target POI set, wherein the related POI consumption records are consumption records associated with any POI in the target POI set, the feature matrix is composed of personal data of each user in the user set, and the personal data of each user comprises personal information and preference information;

calculating the similarity between the feature vector of the tar et user and the feature matrix according to the friend intimacy coefficient; and determining a target POI according to the similarity result obtained by calculation; and returning the target POI.

2. The POI recommendation method based on the graph database according to claim 1, the method further comprising:

acquiring target data and importing the target data into a pre-built graph database to acquire the target graph database, wherein the target data comprises POI data, user data, and an association relationship between the POI data and the user data.

3. The POI recommendation method based on the graph database according to claim 2, wherein the step: acquiring target data and importing the target data into the pre-built graph database to acquire the target graph database, comprises:

acquiring the target data in a data warehouse, the target data comprising the POI data, the user data, and the association relationship between the POI data and the user data;

processing the target data into graph elements of the graph database;

building batched tasks and converting the graph elements into a file format of the graph database in batches to acquire a graph element file; and pulling the graph element file from the data warehouse to a graph database server corresponding to the graph database and ingesting it into the graph database to acquire the target graph database.

4. The POI recommendation method based on the graph database according to claim 1, wherein the step: according to the ID and the positioning information of the target user, acquiring the feature vector of the target user, the friend intimacy coefficient of the target user and the target POI set, specifically comprises the following steps:

invoking a user-defined function and querying personal data of the target user and the friend intimacy coefficient of the target user according to the ID of the target user, the personal data of the target user comprising user information and preference information;

forming the feature vector of the target user by the personal data of the target user; and invoking the user-defined function, querying POI within a preset distance range according to the positioning information, and forming the target POI set by the POI in the preset distance range.

5. The POI recommendation method based on the graph database according to claim 4, wherein the step: according to the target POI set, acquiring the feature matrix of the user set with the related POI consumption records, comprises the following steps:

invoking the user-defined function, querying users with the related POI consumption records, and forming the user set by the users with the related consumption records, the related POI being any POI in the target POI set;

sequentially acquiring personal data of each user in the user set and sequentially forming a first feature vector by the personal data of each user, the personal data of each user comprising personal information and the preference information; and forming a first feature matrix by the first feature vector of each user in the user set to acquire the feature matrix of the user set, each column of element in the feature vector being the first feature vector of one user in the user set.

6. The POI recommendation method based on the graph database according to claim 5, wherein the step: forming the user set by the users with the related POI consumption records, and processing the user set, comprises: de-duplicating each user in the user set.

7. The POI recommendation method based on the graph database according to claim 1, wherein the step according to the friend intimacy coefficient, calculating the similarity of the feature vector of the target user and each of the feature matrixes, comprises:

according to a similarity calculation function, calculating the similarity of the feature vector of the target user and the feature matrix, the similarity calculation formula being:

$$sim(\alpha, X, Y) = \alpha \times \frac{\sum_{i=1}^{n}(x_i \times y_i)}{\sqrt{\sum_{i=1}^{n}(x_i)^2} \times \sqrt{\sum_{i=1}^{n}(y_i)^2}},$$

wherein X represents the feature vector of the target user, Y represents the feature matrix, a being the friend intimacy coefficient of X and Y, $x_i$ being an $i^{th}$ element in X, $y_i$ being an $i^{th}$ column of element in Y, and n represents a total number of the elements in X or a total column number of the elements in Y.

8. The POI recommendation method based on the graph database according to claim 1, wherein the step of determining the target POI of the target POI set according to each of the similarities, comprises:

sorting similarity results in a descending order;

selecting top n users in a similarity order; and querying the POI consumed most by the top n users in the similarity order to acquire the target POI.

9. The POI recommendation method based on the graph database according to claim 1, wherein the step: acquiring the target POI set from the target graph database according to the positioning information, comprises:

acquiring different grid IDs corresponding to each POI in the target graph database, each grid ID of each POI corresponding to one grid level;

building a mapping relationship from each POI to the different grid IDs and caching the mapping relationship in the graph database;

receiving target geographic coordinates and acquiring a target geographic coverage area according to the target geographic coordinates;

acquiring a grid ID set of the target geographic coverage area according to a preset target grid level; and according to the mapping relationship from each POI to the different grid IDs, querying a POI set corresponding to the grid ID set from the graph database.

10. The POI recommendation method based on the graph database according to claim 9, wherein the step: acquiring the different grid IDs corresponding to each POI in the target graph database, comprises:

based on a geographic geometry library, calculating a grid ID of each POI under different grid levels to acquire the different grid IDs corresponding to each POI, the different grid levels and the grid IDs under different grid levels being pre-defined by the geographic geometry library.

11. The POI recommendation method based on the graph database according to claim 10, wherein the step: acquiring the grid ID set of the target geographic coverage area according to the preset target grid level, comprises:
calculating a grid ID of the target geographic coverage area based on the geographic geometry library and according to the preset target grid level, the geographic geometry library being google s2, the geographic geometry library pre-defining 30 grid levels, and each geographic coordinate having a grid ID in each grid level.

12. The POI recommendation method based on the graph database according to claim 9, wherein the step: building the mapping relationship from each POI to the different grid IDs and caching the mapping relationship in the graph database, specifically comprises the following steps:
taking each POI as a POI node of the graph database respectively;
taking the different grid IDs corresponding to each POI as a grid node of the graph database respectively; and
building the mapping relationship between each POI node and different grid nodes corresponding to each POI, an attribute of the mapping relationship being a grid level.

13. The POI recommendation method based on the graph database according to claim 9, wherein the step: building the mapping relationship from each POI to the different grid IDs and caching the mapping relationship in the graph database, specifically comprises the following steps: building a suspension relationship between each POI and the different grid IDs corresponding to each POI respectively and storing the suspension relationship in an independent graph space.

14. The POI recommendation method based on the graph database according to claim 9, wherein the step: receiving the target geographic coordinates and acquiring the target geographic coverage area according to the target geographic coordinates, comprises:
calculating the target geographic coverage area of the target geographic coordinates according to a preset coverage mode, the preset coverage mode comprising a circular coverage mode or a polygonal coverage mode.

15. The POI recommendation method based on the graph database according to claim 14, wherein the step: calculating the target geographic coverage area of the target geographic coordinates according to the preset coverage mode, comprises:
acquiring circle center coordinates and a radius when calculating the target geographic coverage area of the target geographic coordinates according to the circular coverage mode, and
building the target geographic coverage area according to the circle center coordinates and the radius; or acquiring coordinates of each vertex of a polygon when calculating the geographic coverage area of the geographic coordinates according to the polygonal coverage mode, and building the target geographic coverage area according to the coordinates of each vertex.

16. A non-transitory storage medium, storing a computer program to perform a POI query method based on a distributed graph database, comprising the following steps:
acquiring data, and importing the data into a pre-constructed graph database, wherein the data comprises POI data, user data and an incidence relation between the PO data and the user data;
receiving ID and positioning information of a target user;
acquiring a feature vector of the target user, a friend intimacy coefficient of the target user and a target POI set from the graph database according to the ID and the positioning information of the target user, wherein the feature vector of the target user is composed of personal data of the target user, the personal data of the target user comprises user information and preference information, and the target POI set is a set composed of POs in a preset distance range inquired according to the positioning information;
acquiring a feature matrix of a user set with related POI consumption records from the graph database according to the target POI set, wherein the related POI consumption records are consumption records associated with any POI in the target POI set, the feature matrix is composed of personal data of each user in the user set, and the personal data of each user comprises personal information and preference information;
calculating the similarity between the feature vector of the target user and the feature matrix according to the friend intimacy coefficient; and
determining a target POI according to the similarity result obtained by calculation; and
returning the target POI.

17. An electronic device, comprising a processor coupled to a memory to perform a POI query based method on a distributed graph database, comprising the following steps:
acquiring data, and importing the data into a pre-constructed graph database, wherein the data comprises POI data, user data and an incidence relation between the POI data and the user data;
receiving ID and positioning information of a target user;
acquiring a feature vector of the target user, a friend intimacy coefficient of the target user and a target POI set from the graph database according to the ID and the positioning information of the target user, wherein the feature vector of the target user is composed of personal data of the target user, the personal data of the target user comprises user information and preference information, and the target POI set is a set composed of POIs in a preset distance range inquired according to the positioning information;
acquiring a feature matrix of a user set with related POI consumption records from the graph database according to the target POI set, wherein the related POI consumption records are consumption records associated with any POI in the target POI set, the feature matrix is composed of personal data of each user in the user set, and the personal data of each user comprises personal information and preference information;
calculating the similarity between the feature vector of the target user and the feature matrix according to the friend intimacy coefficient; and
determining a target POI according to the similarity result obtained by calculation; and
returning the target POL.

* * * * *